United States Patent
Danner et al.

[11] Patent Number: 5,750,252
[45] Date of Patent: May 12, 1998

[54] PROTECTIVE COATING FOR METAL SURFACES

[75] Inventors: Mark C. Danner, Newark; Kenneth E. Klaber, Reynoldsburg, both of Ohio

[73] Assignee: The Dow Chemical Company, Midland, Mich.

[21] Appl. No.: 460,160

[22] Filed: Jun. 2, 1995

[51] Int. Cl.$^6$ ............... B32B 15/04; B32B 15/08; B32B 27/08; B32B 27/00
[52] U.S. Cl. ............... 428/332; 428/457; 428/461; 428/515; 428/463
[58] Field of Search ............... 428/463, 461, 428/515, 457, 480, 482, 483, 500, 516, 523, 332

[56] References Cited

U.S. PATENT DOCUMENTS

| | | | |
|---|---|---|---|
| 4,132,857 | 1/1979 | Scarola | 174/107 |
| 4,452,374 | 6/1984 | Hitchcock et al. | 220/458 |
| 4,452,375 | 6/1984 | Marcus | 220/458 |
| 4,668,571 | 5/1987 | Moriarty, Jr. | 428/327 |
| 4,687,688 | 8/1987 | Curie et al. | 428/35 |
| 4,738,810 | 4/1988 | Cheng-Shiang | 264/54 |
| 4,770,912 | 9/1988 | Furrer et al. | 428/35 |
| 4,865,902 | 9/1989 | Golike et al. | 428/215 |
| 5,000,992 | 3/1991 | Kelch | 428/36.5 |
| 5,006,383 | 4/1991 | Achille et al. | 428/35.9 |
| 5,066,542 | 11/1991 | Tabor et al. | 428/461 |
| 5,112,696 | 5/1992 | Roberts | 428/516 |
| 5,316,606 | 5/1994 | Andre | 156/201 |
| 5,346,963 | 9/1994 | Hughes et al. | 525/285 |

FOREIGN PATENT DOCUMENTS

| | | |
|---|---|---|
| 0062385 | 10/1982 | European Pat. Off. . |
| 312302B1 | 10/1988 | European Pat. Off. . |
| 0 479 457 A1 | 4/1992 | European Pat. Off. . |
| 592920A1 | 5/1993 | European Pat. Off. . |
| 0 592 920 A1 | 4/1994 | European Pat. Off. . |
| 0 664 209 A1 | 7/1995 | European Pat. Off. . |
| 1324952 | 7/1973 | United Kingdom . |
| 2 144 901 | 3/1995 | United Kingdom . |

OTHER PUBLICATIONS

"Laminated packing sheet—includes aluminum fold sandwiching synthetic resin core and protective outer hot sealable resin skin", Derwent 87–105781, Dainippon Printing KK. (Mar. 1987).

Prrepn. of steel sheet pile coated with highly anti–corrosive film—by co–extruding polyolefin and modified by unsatd. carboxylic acit, polyolefin and thermoplastic resin and hot, pressing etc., Derwent 88–217461, Mitsubishi Chem Ind KK (Jun. 1988).

"Membrane for laminated tubes or small containers—includes aluminum foil, ethylene:–(meth)acrylic! acid copolymer layer, low density polyethylene layer, etc,", Derwent, Kansai Tube KK (Jul. 1988).

"Laminated Film e.g. for protecting metal plates—comprises polyethylene layer and adhesive ethylene! Copolymer layer", Derwent 80–084448C, Showa Denko KK (Dec. 1979).

*Primary Examiner*—John J. Zimmerman
*Assistant Examiner*—Michael LaVilla

[57] ABSTRACT

A protective coating and a metal protected by the coating is provided as well as laminates and thermoplastic films useful for making the protected metal surfaces. The coating comprises a multilayer or dual-film coating. The first film is an adhesive layer to hold the second film as a protective coating to the metal surface. The first film may be either a monolayer or dual-layer film of ethylene acrylic acid and carboxymodified polyethylene. The second film is extruded over the first and comprises a low density polyethylene. The protective coating provides increased abrasion resistance and superior adhesion as demonstrated by peel strengths between both the film to extrudate interface and the film to metal interface.

18 Claims, No Drawings

PROTECTIVE COATING FOR METAL SURFACES

BACKGROUND OF THE INVENTION

This invention relates to protective coatings for metal surfaces. More particularly, this invention relates to a dual or multilayer protective coating for metal surfaces that is highly adherent to metal surfaces and has improved layer to layer interface peel strengths.

Metal surfaces are susceptible to corrosion from various sources such as moisture, air and a wide variety of chemical compounds. This corrosion potential has historically limited the use of metal in many applications, including sanitary or sewer systems and industrial processes involving acidic chemical compounds. As a result, several prior art coatings have been developed to protect metal surfaces in these applications.

Metal surfaces, such as the interior surfaces of metal pipe, have been lined with concrete to provide corrosion resistance. However, these approaches are less than satisfactory because the concrete attaches poorly to metal surfaces. Additionally, the concrete cracks, chips, and pulls away from the metal surface leaving the metal exposed. Alternatively, attempts have been made to form the metal pipe from plastic laminated steel sheet. One such product is known as Black-Klad®, a product of the Inland Steel Company of Chicago, Ill. Prior to forming the steel sheet into a pipe, the surface of the steel sheet to be the inner pipe surface is laminated with a carbon black-filled polyethylene compound. The thickness of the coating is limited to 0.10 inch (0.25 cm) and is intended to resist corrosion of the metal. However, due to the comparatively thin layer thickness of the laminate, the laminate tends to wear through due to abrasion, exposing the metal surface to corrosion.

SUMMARY OF THE INVENTION

This need is met by the present invention, wherein a protective coating for metal surfaces is provided. The protective coating is a multilayer or dual polymer film coating. The protective coating provides superior peel strengths at the polymer layer to layer interface as well as at the polymer to metal interface. In addition, the protective coating provides superior protection against abrasion in the outer layer or extrudate.

In accordance with a first aspect of the present invention, a protective coating for metal surfaces is provided. The coating comprises a first film for securing said coating to a metal surface. The film includes a first layer of a copolymer of ethylene and acrylic acid and a second layer of a carboxy-modified polyethylene. Preferably, the carboxy-modified polyethylene is a blend of polyethylene and maleic anhydride and the polyethylene is preferably a low density polyethylene. The coating also comprises an extrudate of a low density polyethylene bonded to the first film at a film to extrudate interface having a peel strength of at least about 50 pounds per inch (8.92 Kg/cm), more preferably at least about 70 pounds per inch (12.5 Kg/cm), and most preferably at least about 90 pounds per inch (16.07 Kg/cm).

Preferably, the low density polyethylene in both the first film and the extrudate is a linear low density polyethylene and the extrudate is a blend of linear low density polyethylene and low density polyethylene. The blend of low density polyethylene and maleic anhydride preferably includes about 0.05 to about 10% by weight maleic anhydride. In the first film, the copolymer of ethylene and acrylic acid comprises about from about 6% to about 9% acrylic acid by weight and the first layer comprises from about 50% to about 5% of the thickness of the first film with the remainder being the second layer.

In accordance with an additional aspect of the present invention, a protected metal surface is provided. The protected metal surface comprises a base metal layer having at least one metal surface. An intermediate film is secured to the metal surface.

The intermediate film can be a single polymer layer selected from the group consisting of a copolymer of ethylene and acrylic acid, a copolymer of ethylene and methyl acrylic acid, a carboxy-modified low density polyethylene, and a carboxy-modified high density polyethylene. An extrudate of low density polyethylene is then bonded to the intermediate film at a film to extrudate interface. The film to extrudate interface has a peel strength of at least about 50 pounds per inch (8.92 Kg/cm), and more preferably at least about 70 pounds per inch (12.5 Kg/cm), and most preferably at least about 90 pounds per inch (16.07 Kg/cm).

The intermediate film may also comprise a dual-layer film. The dual-layer film may comprise a first layer of a copolymer of ethylene and acrylic acid and a second layer of a carboxy-modified polyethylene. Preferably, the second layer is a blend of low density polyethylene and maleic anhydride. The first layer preferably comprises from about 50% to about 5% of the thickness of the intermediate film, with the remainder being the second layer. The copolymer of ethylene and acrylic acid is preferably about 6–9% acrylic acid by weight.

The blend of low density polyethylene and maleic anhydride preferably comprises about 0.05 to about 10% by weight maleic anhydride. The low density polyethylene is preferably a linear low density polyethylene. The extrudate is preferably a linear low density polyethylene, and more preferably is a blend of linear low density polyethylene and low density polyethylene.

Accordingly, it is an object of the present invention to provide a protective coating for metal that provides superior film to extrudate peel strengths and abrasion resistance. It is a further object of the present invention to provide a protective coating that comprises a multilayer first film of ethylene acrylic acid and a carboxy-modified low density polyethylene and an extrudate of low density polyethylene. Other objects and advantages of the present invention will be apparent from the following description and the appended claims.

DESCRIPTION OF THE PREFERRED EMBODIMENTS

The present invention relates to a protective coating for metal surfaces. To adequately protect the metal surface, a protective coating should be sufficiently durable to withstand abrasion from various items coming into contact with the protected surface. If the peel strength at either the metal to polymer interface or the polymer film to extrudate interface is not of sufficient strength, the protective coating will fail, causing the metal surface to be exposed to corrosion. The present invention provides a protective coating for metal surfaces that provides superior peel strengths at both the metal to polymer interface and, more particularly, at the polymer film to extrudate interface.

The protective coating of the present invention comprises a polymer multilayer or dual-film. The coating comprises a first or intermediate polymer film as an adhesive or tie film. The first film functions to adhere the protective coating to the metal surface upon which a protective coating is desired.

The first film should be capable of providing a peel strength at the metal to polymer film interface between the first layer and the metal surface of at least about 50 pounds per inch (8.92 Kg/cm). More preferably, the first film provides a peel strength at the metal to polymer film interface of at least about 70 pounds per inch (12.5 Kg/cm) and most preferably at least about 90 pounds per inch (6.07 Kg/cm).

The polymer employed in the first film may be a polymer with the predominate material being selected from the group of polymers including copolymers of ethylene and acrylic acid, copolymers of ethylene and methyl acrylic acid, carboxy-modified low density polyethylene, carboxy-modified linear low density polyethylene, carboxy-modified high density polyethylene, and mixtures of any of the above. The polyethylene materials are carboxy-modified with any suitable compound that can provide carboxy units to the polyethylene. Particularly suitable carboxy modifying compounds are the anhydrides such as maleic anhydride or succinic anhydride with maleic anhydride being preferred.

When employing copolymers of ethylene and acrylic acid or of ethylene and methyl acrylic acid, the copolymer preferably contains from about 5% to about 15% by weight acrylic or methyl acrylic acid copolymerized with the ethylene. More preferably, the copolymer includes from about 6% to about 9% acrylic acid by weight in the ethylene/acrylic acid copolymer with about 9% by weight the most preferred. A suitable copolymer of ethylene and acrylic acid is available in the PRIMACOR® line of ethylene and acrylic acid blends available from the Dow Chemical Company of Midland, Mich. In addition, various additives such as antiblocking agents, antioxidant agents, pigments or UV stabilizers may be included in the copolymers. These additives are all well known in the art and commercially available from numerous suppliers.

The carboxy-modified polyethylenes useful in the first or intermediate film layer are preferably polyethylene/maleic anhydride blends which contain from about 0.05 to about 10% maleic anhydride by weight in the final blend. More preferably, the blends include about 0.15 to about 0.3% by weight maleic anhydride, and most preferably about 0.2% by weight maleic anhydride, in the final blend. The maleic anhydride may be blended with the various polyethylenes or a "let down" method may be used. By "let down" it is meant that the polyethylenes and maleic anhydride are blended by using a carrier material. The carrier material contains maleic anhydride in a higher concentration than desired in the final blend. The carrier material containing maleic anhydride is then blended with the polyethylene to give the proper proportions of maleic anhydride in the final blend. Suitable carriers include, but are not limited to, polyethylenes such as ultra low density polyethylene and high density polyethylene. When employing a carrier, that carrier preferably should be less than about 20% by weight of the final blend.

For the purposes of this application, high density polyethylene is a polyethylene that is commonly employed in the art or one with a density of about 0.94 gms/cc and above, low density polyethylene is a polyethylene having a density of from about 0.91 to about 0.94 grams/cc, linear low density polyethylene is a polyethylene having much the same density as low density polyethylene but has long chain branches in the polyethylene, and ultra low density polyethylene is a polyethylene having a density of from about 0.90 to about 0.92 gms/cc. In addition, when employing a linear low density polyethylene, the polyethylene can be a "substantially" linear polyethylene. Substantially linear polyethylenes display densities as low as about 0.87 gms/cc. Substantially linear polyethylenes are those polyethylenes commercially available from the Dow Chemical Company as polymer resins made using the Insite® constrained geometry catalysts. Substantially linear polyethylenes are described in detail in U.S. Pat. Nos. 5,272,236, 5,278,272, and 5,346,963, of which the disclosures of all three are herein incorporated by reference.

The carboxy-modified polyethylene of the present invention may include various additives. Such additives include antiblocking agents, antioxidant agents, pigments or UV stabilizers. These additives are all well known in the art and commercially available from numerous suppliers. The preferable carboxy-modified polyethylene for the first or intermediate film is a linear low density polyethylene/maleic anhydride blend containing about 0.2% maleic anhydride by weight in the final blend. In addition, such blends can be created by blending linear low density polyethylene with a blend of a carrier polyethylene material and maleic anhydride in proportions to provide a maleic anhydride concentration in the final blend of about 0.2% by weight.

The first or intermediate film may be either a monolayer or a multilayer film. When employing the monolayer film as the first film, the film is manufactured by any of the techniques well known in the art such as cast or blown film techniques from one of the above-identified polymers. When employing a monolayer, the polymer material is preferably a copolymer of ethylene and acrylic acid or a blend of linear low density polyethylene and about 0.2% by weight maleic anhydride.

Preferably, however, the first or intermediate film is a multilayer film. The multilayer film has a first layer adjacent to the metal surface to be protected and a second layer that provides a film to extrudate interface with the second film of the dual film protective coating of the present invention.

The first layer of the first or intermediate film is a polymer layer. The predominant material of the first layer may be selected from the group consisting of copolymers of ethylene and acrylic acid, copolymers of ethylene and methyl acrylic acid, carboxy-modified low density polyethylene, carboxy-modified linear low density polyethylene, and carboxy-modified high density polyethylene. All of the polymers of the first layer are as described above.

The second layer of the first or intermediate film is also a polymer layer. The predominant material of the second layer may be selected from the group consisting of copolymers of ethylene and acrylic acid, copolymers of ethylene and methyl acrylic acid, carboxy-modified low density polyethylene, carboxy-modified linear low density polyethylene, and carboxy-modified high density polyethylene. All of the polymers of the second layer are as described in detail above.

The second layer in the multilayer film may be coextruded with the first layer away from the metal surface. In this manner, the resulting coextruded multilayer film can later be laminated or otherwise adhered to the metal surface to be protected.

When employing the preferred multilayer film as the first or intermediate film, the first layer is preferably a copolymer of ethylene and acrylic acid while the second layer is preferably either a blend of low density polyethylene and maleic anhydride or, most preferably, a blend of linear low density polyethylene and maleic anhydride. The maleic anhydride is preferably about 0.2% by weight in both blends. The preferred multilayer films are manufactured by any of the known techniques in the art such as coextrusion via cast or blown film techniques.

When employing the preferred multilayer first or intermediate film of the present invention, the first layer adjacent the metal surface comprises from about 50% to about 5% of the total thickness of the first or intermediate film. The remainder, or from about 50% to about 95% of the total thickness of the first film, is the second layer. Preferably, the first layer comprises about 40% and the second layer comprises about 60% of the total thickness of the first or intermediate film.

The protective coating also includes an extrudate on the first or intermediate film. The extrudate acts as the protectant for the metal surface while the first film or intermediate film acts as an adhesive to hold the extrudate on the metal surface. The extrudate preferably provides abrasion and corrosion resistance to the protected metal surface of the present invention. Extrudates are generally polymer layers having a minimum thickness of at least about 20 mils (0.0508 cm) and preferably about 40 mils (0.102 cm). Films are generally polymer layers having a maximum thickness of about 10 mils (0.0254 cm).

The extrudate of the present invention is a layer of low density polyethylene. More preferably, the extrudate is a linear low density polyethylene or a blend of linear low density polyethylene and low density polyethylene. A suitable linear low density polyethylene is commercially available under the trade name DOWLEX 2045® (available from the Dow Chemical Company of Midland, Mich.).

The extrudate is extruded on or otherwise placed on the first layer such as by lamination as is well known in the art. The first film forms a film to extrudate interface with the extrudate. The first film also provides a polymer film to metal interface with the protected metal surface. The film to extrudate interface should preferably provide a peel strength of at least about as great as the film to metal interface. Thus, the peel strength of the film to extrudate interface should preferably be at least about 50 pounds per inch (8.92 Kg/cm), more preferably at least about 70 pounds per inch (12.5 Kg/cm) and most preferably at least about 90 pounds per square inch (16.07 Kg/cm). All peel strengths as specified in this application were determined using ASTM Test Method D-903 titled PEEL STRENGTH DATA with the modifications of a pull speed of 5 inches per minute (12.7 cm) and a sample width of ½ inch (1.27 cm).

The protective coating of the present invention also provides superior abrasion resistance to the coatings of the prior art. Abrasion resistance of a protective coating is a particularly important aspect of the performance of the coating. If the protective coating has low abrasion resistance, it will wear from the metal surface much more easily and more quickly than a coating with a higher abrasion resistance. Thus, a protective coating with a low abrasion resistance will fail more quickly, and the protected surface will corrode sooner than desired. The protective coatings of the present invention provide an abrasion resistance of up to 50% greater than the abrasion resistance of the coatings of the prior art employing outer layers of high density polyethylene. The protective coatings of the present invention show a total weight loss due to abrasion of less than about 0.100 grams/square inch, and more preferably of less than about 0.075 grams/square inch, and most preferably of less than about 0.050 grams/square inch. The abrasion resistance of the protected metal surface was measured according to ASTM test method A 926 titled ABRASION RESISTANCE OF COATING MATERIALS FOR CORRUGATED METAL PIPE.

The protective coating of the present invention is ideally suited for the protection of metal surfaces, such as steel. Although not intended to be limited to any one specific metal surface or product, the protective coating is uniquely suited for use as protective coatings for metal pipe which is formed integrally with a polymer liner. Such a process is described in U.S. Pat. No. 5,316,606 to Andre, the disclosure of which is herein incorporated by reference.

The protective coating of the present invention will now be illustrated by reference to several examples. The protective coating is not intended to be limited to the specific, exemplary materials but, rather, may be practiced generally by the principles espoused below.

COMPARATIVE EXAMPLE 1

A multilayer intermediate film 10 mils (0.254 cm) thick was coextruded using a blown film process, for application to a metal surface. The intermediate film comprised a first layer of ethylene acrylic acid comprising about 6% acrylic acid by weight and a second layer comprising a blend of about 98% by weight ethylene acrylic acid and about 2% by weight of a blend of about 90% by weight polyethylene and about 10% by weight antioxidant and UV absorber. The intermediate film was laminated to a cleaned and pretreated galvanized steel sheet pre-heated to about 400° F. (204° C.) by pressure from neoprene rubber nip rollers. A high density polyethylene was extruded as an extrudate over the intermediate film to a total coating thickness of both films of 60.7 mils (1.54 cm).

The coated metal sheet was then subjected to a peel strength test according to ASTM D-903 modified to use a ½ inch wide (1.27 cm) test strip and a peel rate of 5 inches per minute (12.7 cm/min). The coating peeled at the film to extrudate interface at 8 pounds per ½ inch or 16 pounds per inch (2.86 Kg/sq. cm). In a second run according to the example and employing a total coating thickness of 64.1 mils (1.63 cm), the coating peeled at the film to extrudate interface at 8 pounds per ½ inch or 16 pounds per inch (2.86 Kg/cm).

COMPARATIVE EXAMPLE 2

A multilayer intermediate film was extruded and applied to three galvanized steel sheets as in Comparative Example 1. An extrudate of linear low density polyethylene was extruded over the intermediate film to a total coating thickness of 65.5 mils (1.66 cm), 66.5 mils (1.60 cm) and 67.2 mils (1.71 cm). The samples were tested as in Comparative Example 1 and resulted in failure at the film to extrudate interface with peel strengths of 26, 22 and 32 pounds per inch (4.64, 3.93 and 5.71 Kg/cm) respectively.

COMPARATIVE EXAMPLE 3

A multilayer intermediate film was extruded and applied to two galvanized steel sheets as in Comparative Example 1. The intermediate film was a first layer of ethylene acrylic acid containing about 6% by weight acrylic acid and the second layer was a blend of about 50% high density polyethylene, about 50% linear low density polyethylene, and about 0.2% maleic anhydride. An extrudate of high density polyethylene was extruded over the first film to a total coating thickness of 73.5 mils (1.87 cm) and 72.4 mils (1.84 cm). The samples were tested as in Comparative Example 1 and resulted in failure at the film to extrudate interface with 26 and 24 pounds per inch (4.64 and 4.28 Kg/cm), respectively, of peel strength.

COMPARATIVE EXAMPLE 4

A multilayer intermediate film was extruded and applied to two galvanized steel sheets as in Comparative Example 3.

An extrudate of linear low density polyethylene was extruded to a total coating thickness of 66.8 and 70.1 mils (1.70 and 1.78 cm). The samples were tested as in Comparative Example 1 and resulted in failure at the film to extrudate interface with 24 and 22 pounds per inch of peel strength (4.28 and 3.93 Kg/cm), respectively.

EXAMPLE 1

A multilayer intermediate film was extruded and applied to two galvanized steel sheets as in Comparative Example 1. The intermediate film had a first layer of ethylene acrylic acid having about 6% by weight acrylic acid and a second layer of a blend of linear low density polyethylene and about 0.2% by weight of maleic anhydride. An extrudate of linear low density polyethylene was extruded over the intermediate film to a total coating thickness of 82.1 and 81.7 mils (2.08 and 2.07 cm), respectively. The samples were tested as in Comparative Example 1. Failure or peeling of the film occurred at the metal to film interface at peel strengths of 100 pounds per inch (17.86 Kg/cm) and 94 pounds per inch (16.78 Kg/cm), respectively. Thus, the peel strength of the film to extrudate interface is at least as great as that of the film to metal interface, or, in other words, at least about 100 and 94 pounds per inch (17.86 and 6.61 Kg/cm), respectively.

EXAMPLE 2

A multilayer intermediate film according to the present invention was extruded and applied to a galvanized steel sheet as in Example 1. The intermediate film comprised a first layer of ethylene acrylic acid having about 6% by weight acrylic acid and a second layer of linear low density polyethylene blended with maleic anhydride in an ultra low density polyethylene carrier. The final maleic anhydride content is about 0.2% by weight. An extrudate of linear low density polyethylene was then extruded over the intermediate film to a depth of about 85 mils (2.16 cm). The sample was tested as in Comparative Example 1 and failure occurred at the film to metal interface with a peel strength of 80 pounds per inch (14.27 Kg/cm). Thus, the peel strength of the film to extrudate interface is at least about 80 pounds per inch (14.27 Kg/cm).

COMPARATIVE EXAMPLE 5

A multilayer intermediate film was extruded on a galvanized steel sheet as in Example 1. An extrudate of high density polyethylene was extruded over the intermediate film. The sample was placed in an abrasion resistance chamber and tested according to ASTM A 926. The sample showed a weight loss due to abrasion of 0.124 grams/square inch.

COMPARATIVE EXAMPLE 6

A multilayer intermediate film was extruded on a galvanized steel sheet as in Example 2. An extrudate of high density polyethylene was extruded over the intermediate film. The sample was tested as in Comparative Example 5. The sample showed a weight loss due to abrasion of 0.155 grams/square inch.

EXAMPLE 3

A protective coating was provided on two samples of a galvanized steel sheet as in Example 1. The samples were tested as in Comparative Example 5. The samples show a weight loss due to abrasion of 0.072 grams/square inch and 0.098 grams/square inch, respectively.

EXAMPLE 4

A protective coating was provided on a sample of a galvanized steel sheet as in Example 2. The samples were tested as in Comparative Example 5. The sample showed a weight loss due to abrasion of 0.067 grams/square inch.

EXAMPLE 5

A multilayer intermediate film was provided on a galvanized steel sheet as in Example 1. An extrudate of a blend of linear low density polyethylene and low density polyethylene was extruded on the intermediate film. A sample was tested as in Comparative Example 5. The sample showed a weight loss due to abrasion of 0.025 grams/square inch.

Having described the invention in detail and by reference to the preferred embodiments thereof, it will be apparent that modifications and variations are possible without departing from the scope of the invention which is defined in the appended claims.

What is claimed is:

1. A protective coating for a metal surface comprising:
   a) an adhesive film for adhering the coating to the metal surface consisting essentially of:
      i) a first layer of a copolymer of ethylene and acrylic acid; and
      ii) a second layer consisting essentially of a blend of low density polyethylene and maleic anhydride: and
   b) an extrudate of low density polyethylene, said extrudate forming a film to extrudate interface with said second layer of said adhesive film, the film to extrudate interface having a peel strength of at least about 50 pounds per inch.

2. The protective coating as claimed in claim 1, wherein the low density polyethylene in said second layer of said adhesive film is a linear low density polyethylene.

3. The protective coating as claimed in claim 1, wherein said blend of low density polyethylene and maleic anhydride comprises from about 0.05% to about 10% by weight maleic anhydride.

4. The protective coating as claimed in claim 1, wherein said extrudate is a linear low density polyethylene.

5. The protective coating as claimed in claim 1, wherein said extrudate is a blend of linear low density polyethylene and low density polyethylene.

6. The protective coating as claimed in claim 1, wherein said first layer of said adhesive film comprises from about 50% to about 5% of the total thickness of said adhesive film, and wherein said second layer of said adhesive film comprises from about 50% to about 95% of the total thickness of said adhesive film.

7. The protective coating as claimed in claim 1, wherein the film to extrudate interface has a peel strength of at least about 70 pounds per inch.

8. The protective coating as claimed in claim 1, wherein the film to extrudate interface has a peel strength of at least about 90 pounds per inch.

9. The protective coating as claimed in claim 1, wherein the copolymer of ethylene and acrylic acid comprises from about 6% to about 9% by weight acrylic acid.

10. A protected metal surface comprising:
    a) a metal surface;
    b) an adhesive film adhered to said metal surface, said adhesive film consisting essentially of:
       i) a first layer of a copolymer of ethylene and acrylic acid, said first layer forming a film to metal surface interface with said metal surface, wherein the film to metal surface interface has a peel strength of at least about 50 pounds per inch; and ii) a second layer consisting essentially of a blend of low density polyethylene and maleic anhydride; and c) an extrudate of low density polyethylene, said extrudate forming a film to extrudate interface with said second layer of said adhesive film, wherein the film to extrudate interface has a peel strength of at least about 50 pounds per inch.

11. The protected metal surface as claimed in claim 10, wherein the low density polyethylene in said second layer is a linear low density polyethylene.

12. The protected metal surface as claimed in claim 10, wherein the blend of low density polyethylene and maleic anhydride comprises from about 0.05% to about 10% by weight maleic anhydride.

13. The protected metal surface as claimed in claim 10, wherein said extrudate is a linear low density polyethylene.

14. The protected metal surface as claimed in claim 10, wherein said extrudate is a blend of linear low density polyethylene and low density polyethylene.

15. The protected metal surface as claimed in claim 10, wherein said first layer of said adhesive film comprises from about 50% to about 5% of the total thickness of said adhesive film, and wherein said second layer of said adhesive film comprises from about 50% to about 95% of the total thickness of said adhesive film.

16. The protected metal surface as claimed in claim 10, wherein the film to extrudate interface has a peel strength of at least about 70 pounds per inch.

17. The protected metal surface as claimed in claim 10, wherein the film to extrudate interface has a peel strength of at least about 90 pounds per inch.

18. The protected metal surface as claimed in claim 10, wherein the copolymer of ethylene and acrylic acid comprises from about 6% to about 9% acrylic acid.

* * * * *